J. C. WELLS.
EYEGLASS AND SPECTACLE RIM.
APPLICATION FILED MAY 21, 1909.
989,218.
Patented Apr. 11, 1911.
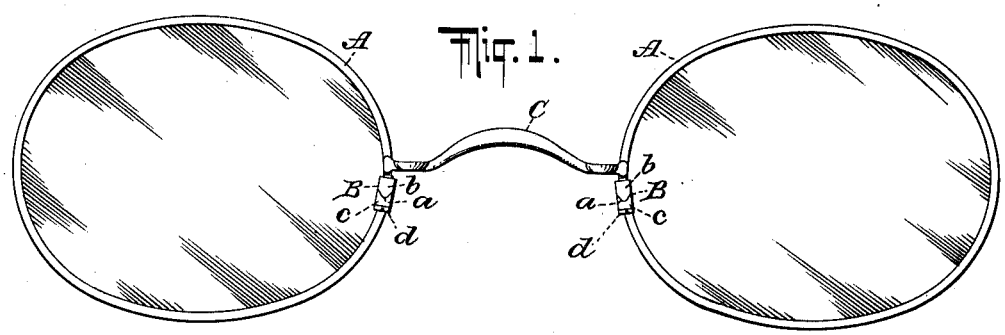
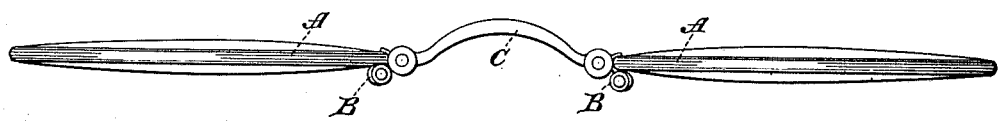
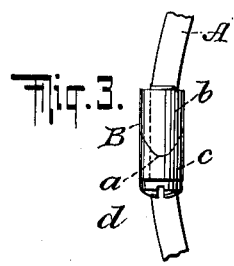
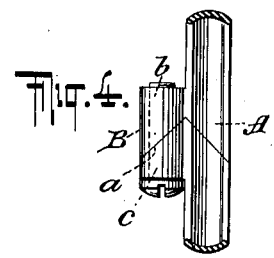
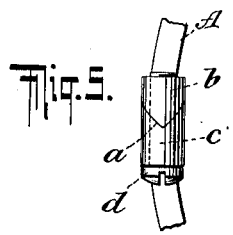
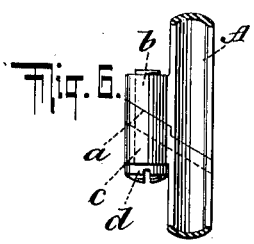
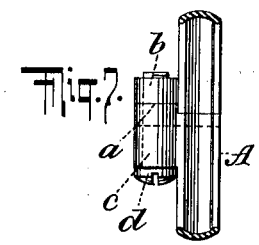
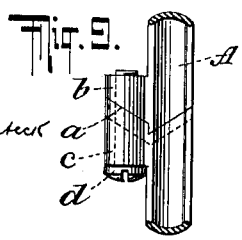
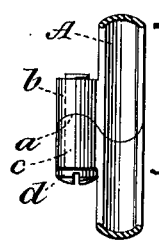
WITNESSES:
John A. Kauntuk
John Lotka
INVENTOR
Joel C. Wells
BY
Briesen Knauth
ATTORNEYS

UNITED STATES PATENT OFFICE.

JOEL C. WELLS, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASS AND SPECTACLE RIM.

989,218.

Specification of Letters Patent.  Patented Apr. 11, 1911.

Application filed May 21, 1909. Serial No. 497,377.

*To all whom it may concern:*

Be it known that I, JOEL CHENEY WELLS, a resident of Southbridge, Worcester county, and State of Massachusetts, have invented a new and useful Improvement in Eyeglass and Spectacle Rims, of which the following is a specification.

My invention relates to an improved plan of construction and has for its object to make the rims stiffer than heretofore without increase of weight, or as stiff as heretofore with lessening weight in either rims or lenses or both.

A further object of my invention is to make it less necessary to have an exact correspondence between the dimensions and contour of the lens and the dimensions and contour of the rim.

A still further object of my invention is to make the rims, and particularly the joints by means of which the rims are clamped upon the lenses, more sightly and less conspicuous without in any way detracting from their strength or efficiency.

My invention is intended more particularly for eyeglass rims as distinguished from spectacle rims but may be used for the latter, if desired, with advantage; in the description which follows, I have had eyeglasses principally in mind.

Of recent years, rimless eyeglasses have been preferred by the majority of users mainly by reason of their less conspicuous appearance, rimmed glasses generally having not only the encircling band about the lens, but also having upon each rim a projecting portion or lug embodying and including the clamping means or joints by which the rims, which must be openable to admit the lens, are held together to retain the lens in position. These projecting portions are necessarily of considerable size and are even more objectionable on the score of looks than the rims proper. In forming the joint also at which each rim opens to receive its lens, it has been the custom to make a cut straight through the rim and lug at substantially right angles to the plane of the rim and lens. The screw or other clamping device included by the lug and by means of which the joint is locked to retain the lens is necessarily at some distance from the rim proper, and this has made it possible for the two sections of the rim to be easily warped or twisted from their normal plane, thus not only presenting a bad appearance but sometimes permitting the lens to escape from the rim. Furthermore, in the case of lenses a little too large for the rims it has been necessary to accurately grind the edges of said lens until the rim would lock upon the lens with the opposing edges of the joint squarely together; otherwise a gap in the joint and rim would exist and be plainly visible. All of the preceding disadvantages are entirely overcome in my improved rims.

Referring to the drawings, Figure 1 is an enlarged rear elevation of a pair of eyeglass rims embodying one form of my invention, the nose gripping portions being omitted; Fig. 2 is a plan view of Fig. 1; Fig. 3 is a detail elevation of the joint as shown in the right hand rim of Figs. 1 and 2, but still further enlarged; Fig. 4 is a side elevation taken from the right of Fig. 3; Fig. 5 is similar to Fig. 3 but shows a different way of forming the cut in the joint; Fig. 6 is a side elevation looking to the right of Fig. 5; Fig. 7 is another side elevation similar to Fig. 6, the intersection of the two oblique planes being now supposed horizontal instead of inclined downwardly to the plane of the rim as in Fig. 6; Fig. 8 is a side elevation of a joint similar to that shown in the preceding figures, but having a still different style of cut; and Fig. 9 is a side elevation of Fig. 5 in a modified construction in which there is a pair of V's entering from each side, the intersections of said V's being inwardly and downwardly inclined and meeting centrally.

Referring to Figs. 1 to 4 inclusive, A is the rim and B a rearwardly projecting lug, preferably cylindrical in form, and tangent to the rim, fixed to said rim either integrally in process of manufacture or by brazing or other suitable means. I prefer to place this lug B just below the juncture of the rim with the nose piece C, as in this position it becomes, to the casual observer, merged with the nose piece and with such gripping devices as may be employed. This rearwardly projecting lug B and the rim to which it is attached are cut through at $a$ thus dividing the cylindrical lug into two portions, $b$, $c$. Into the axis of the hub and preferably from below is tapped the small clamping screw $d$, by means of which the two halves of the joint or lug are held together and the lens retained in place. By reference to Figs. 3 and 4, it will be noted that the cut by which the joint and rim are separated is not at right angles to the plane of the rim but oblique thereto; in fact starting from the rear, i. e., from the outside of the cylindrical lug B, the cut is first obliquely upward and forward through the lug and then obliquely downward and forward at about the same angle through the rim, so as to constitute an inverted V. I do not require this cut to be thus formed in two portions at an angle to one another for one object of my invention, which is to leave no transverse gap at the joint to readily catch the eye of the observer in case the lens is a little too large for the rim so that opposing surfaces of the joint may not be perfectly brought together; to accomplish this useful purpose, I only require that the cut be substantially oblique to the plane of the rim. Where the cut is straight through at right angles to the rim, it is clear that any failure of the joint to completely close would leave the face of the wearer as a background plainly visible through the gap and thus be very undesirable. With the simple oblique cut as in my invention, the gap may be very material and yet when looked at from any usual position will show only an expanse of metal into the uniform color of which will merge even the severed edges of the joint. Having the joint divided by two cuts meeting at an angle, does however serve another useful purpose, namely, that of keeping the two divided portions of the rim in perfect alinement at all times and making it difficult to warp or twist the one section with reference to the other. In tightening the joint upon a lens, also, it is not necessary to shift the two divided portions by hand to get them in exact alinement, since the two sides of the joint act respectively as plug and socket and automatically seat themselves. The cut as employed in Figs. 1 to 4 inclusive is, broadly speaking, a V formed by two intersecting planes, the line of intersection of said planes being parallel to the plane of the rim. In Fig. 5 the same kind of cut is employed, but the line of intersection is now perpendicular to the plane of the rim. In Fig. 8 the cut comprises two portions of oppositely curved cylinders of revolution, the line tracing said curve being parallel to the plane of the rim.

My invention does not reside in a joint divided by a cut at any particular angle; considering the front of the frame, any cut through rim and lug at a sufficient angle from the horizontal to cut off the view of a normally positioned observer directly through the gap when the joint is slightly opened, is sufficient; or if one or more of several cuts are at an angle it is sufficient. But as regards the feature of maintaining the divided rim in perfect alinement, a cut made by a single oblique plane no matter at what angle, is not as effective as are planes meeting at an angle. Even better than two angularly meeting planes would be two pair of planes, the intersection of one pair being at an angle to the intersection of the other pair and in the same plane (shown in Figs. 5 and 9). In this way shifting in any direction of one part of the rim with reference to the other would be prevented, whereas in the form shown in Figs. 1 to 4, for example, the joint prevents transverse shifting, but shifting in the plane of the rim and lens is hindered only by the set screw $d$; the same is true of the form of cut shown in Fig. 8. In Figs. 5, 6, and 7, on the contrary, shifting in the plane of the rim is impeded by the form of cut, while the set screw $d$ alone prevents transverse shifting.

As applied to spectacles, my improved joint would preferably be at the outer extremities of the rims instead of the inner, and in such case, the joint could be so formed as to serve also as a support for the temple, in the manner already known in the art.

I have shown and described my improved joint as located on the rim adjacent to its longer dimensions and this is the location which I prefer. But the substance and spirit of my invention have nothing essentially to do with the location of my improved joint as regards the longer or shorter dimensions of the rim and I therefore claim my improvement as applied to the rim anywhere with reference to such dimensions.

Having now described my invention what I claim is:

1. In eyeglasses or spectacles the combination of a lens, a rim provided with a rearwardly projecting lug said lug and rim being divided so as to constitute overlapping joint portions, and means for uniting said portions at variable distances from one another thereby adapting the rim to lenses of varying size the overlapping joints aiding alinement and obstructing sight along a horizontal line.

2. In eyeglasses or spectacles the combination of a lens, a rim provided with a rearwardly projecting lug said lug and rim being divided so as to constitute overlapping joint portions, and a screw tangent to the rim for uniting said portions at variable distances from one another thereby adapting the rim to lenses of varying size the overlapping joints aiding alinement and obstructing sight along a horizontal line.

3. An eyeglass or spectacle rim provided with a rearwardly projecting cylindrical lug the axis of said lug being parallel to the rim at the attaching point and said lug and rim being divided by oblique planes to constitute overlapping joint portions said joint portions overlapping both as to the plane of the rim and as to a plane perpendicular to the aforesaid plane in combination with a screw parallel to the axis of the lug and adapted to unite said divided portions at variable distances from one another thereby adapting the rim to lenses of varying size, the overlapping joints aiding alinement and obstructing sight along a horizontal line.

4. An eyeglass or spectacle rim provided with a rearwardly projecting lug, the axis of said lug being parallel to the rim at the attaching point and said lug and rim being divided obliquely to constitute overlapping joint portions, said joint portions overlapping both as to the plane of the rim and as to a plane perpendicular to the aforesaid plane, in combination with a screw adapted to unite said divided portions at variable distances from one another, thereby adapting the rim to lenses of varying size, the overlapping joints aiding alinement and obstructing sight through said joint.

In testimony whereof I have hereunto set my hand this 10th day of May, 1909, in the presence of two subscribing witnesses.

JOEL C. WELLS.

Witnesses:
  NELSON M. BAKER,
  PITT H. HERBERT.